United States Patent
Lim et al.

(10) Patent No.: US 9,906,931 B2
(45) Date of Patent: Feb. 27, 2018

(54) MOBILE TERMINAL HAVING A COMPONENT MODULE

(71) Applicant: LG ELECTRONICS INC., Seoul (KR)

(72) Inventors: Hyungkyu Lim, Seoul (KR); Sujin Heo, Seoul (KR); Jaeoh Kim, Seoul (KR); Jonghwan Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/013,521

(22) Filed: Feb. 2, 2016

(65) Prior Publication Data

US 2016/0353264 A1 Dec. 1, 2016

(30) Foreign Application Priority Data

Jun. 1, 2015 (KR) .......................... 10-2015-0077194

(51) Int. Cl.
| | |
|---|---|
| H04W 24/00 | (2009.01) |
| H04W 4/22 | (2009.01) |
| H04M 1/725 | (2006.01) |
| H04W 12/06 | (2009.01) |
| G06F 21/73 | (2013.01) |
| H04M 1/02 | (2006.01) |

(52) U.S. Cl.
CPC ............ *H04W 4/22* (2013.01); *G06F 21/73* (2013.01); *H04M 1/0254* (2013.01); *H04M 1/72575* (2013.01); *H04M 1/72577* (2013.01); *H04W 12/06* (2013.01)

(58) Field of Classification Search
CPC ........... G06F 1/325; H04W 4/02; H04W 4/22

USPC ........................................ 455/404.1; 710/200
See application file for complete search history.

(56) References Cited

U.S. PATENT DOCUMENTS

| | | | |
|---|---|---|---|
| 5,930,724 A | 7/1999 | Yanagida | |
| 9,684,525 B2 * | 6/2017 | Park ................... | G06F 9/44505 |
| 2001/0043514 A1 | 11/2001 | Kita | |
| 2004/0235450 A1 | 11/2004 | Rosenberg | |
| 2007/0077915 A1 | 4/2007 | Black et al. | |
| 2007/0129099 A1 | 6/2007 | Lee | |

(Continued)

FOREIGN PATENT DOCUMENTS

EP 2282371 2/2011

OTHER PUBLICATIONS

European Patent Office Application No. 16162520.7, Search Report dated Oct. 14, 2016, 10 pages.

*Primary Examiner* — William D Cumming
(74) *Attorney, Agent, or Firm* — Lee Hong Degerman Kang & Waimey

(57) ABSTRACT

A mobile terminal includes a main body, a display, a controller, memory, and a component module. The controller receives locked state information and module identification information of the component module and determines that the component module is a registered component module. The controller further identifies the component module as accessible when the component module is the registered component module or the locked state information indicates that the component module is in the unlocked state, connects to the component module. The controller further changes the locked state information from the lock state into the unlocked state, and deletes the module identification information of the component module from the memory.

11 Claims, 13 Drawing Sheets

(56) References Cited

U.S. PATENT DOCUMENTS

| | | | |
|---|---|---|---|
| 2007/0259648 A1 | 11/2007 | Moon | |
| 2013/0007324 A1* | 1/2013 | Moore | G06F 1/325 710/200 |
| 2015/0018016 A1* | 1/2015 | Zhang | H04W 64/00 455/456.3 |
| 2015/0026447 A1* | 1/2015 | Park | G06F 21/53 713/1 |
| 2016/0353264 A1* | 12/2016 | Lim | H04M 1/72577 |

* cited by examiner

FIG. 10A
FIG. 10B
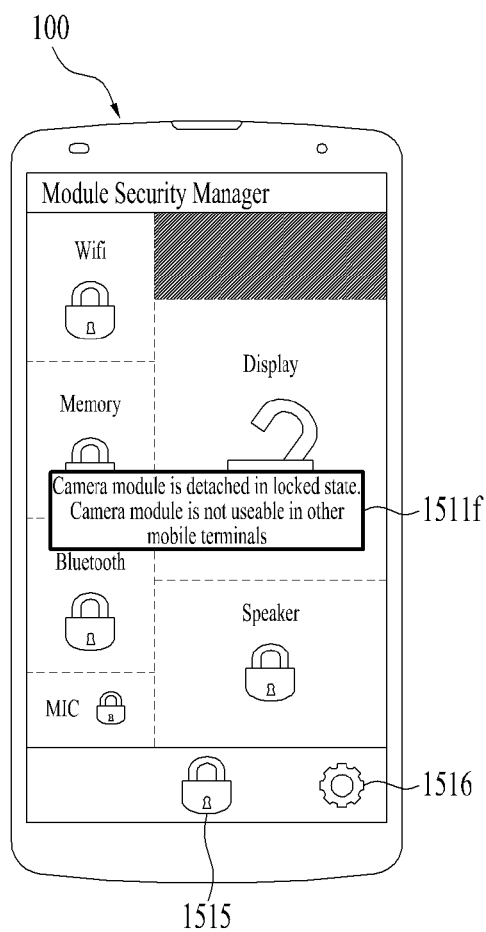
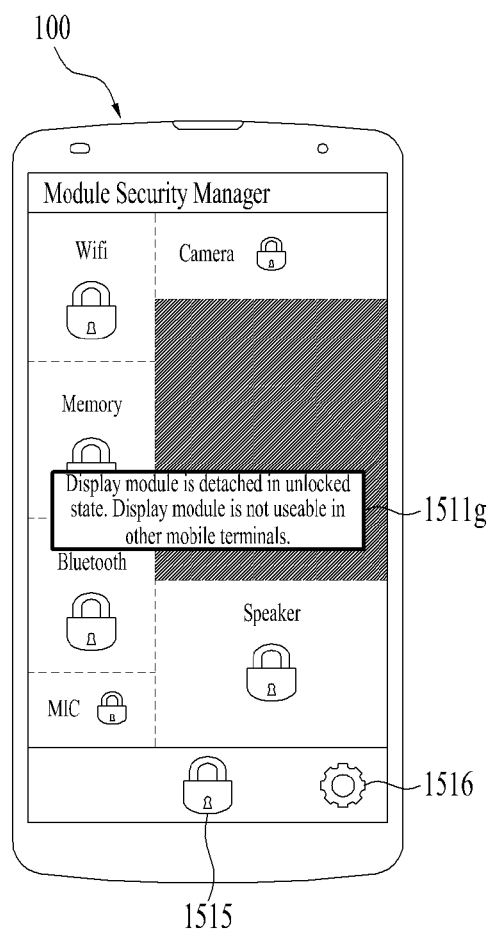

MOBILE TERMINAL HAVING A COMPONENT MODULE

CROSS-REFERENCE TO RELATED APPLICATIONS

Pursuant to 35 U.S.C. § 119(a), this application claims priority to Korean Patent Application No. 10-2015-0077194 filed on Jun. 1, 2015, the entire contents of which are hereby incorporated by reference in their entirety.

BACKGROUND OF THE DISCLOSURE

Field of the Disclosure

Embodiments of the present disclosure relate to a modular type mobile terminal having attachable or replaceable of discrete components which may manage the security of the attachable or replaceable of discrete components.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing or perform functions as multimedia players. Especially, recent mobile terminals may receive the multicast signals configured to visual contents such as broadcasting programs, video files or television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player.

As the functions become more diversified, the functions mainly used by users differ. For example, the users using a camera function mainly desire a high quality camera and the user using a game function or a music playing function desire to enhance a function of a sound card or a speaker.

SUMMARY OF THE DISCLOSURE

An object of the present disclosure is to provide a modular mobile terminal having attachable or replaceable of discrete components, which may manage a lock state for security of the discrete components.

Embodiments of the present disclosure may provide a mobile terminal including a main body; a controller mounted in the main body and comprising a controller memory; and at least one component module assembled or attached to the main body, wherein the controller is configured to receive locked/unlocked state information and identification information of the component module; determine a registered component module in case of identification information of the component module registered in the controller memory; and check accessibility of the component module based on the result of the determination of the registered component module and locked/unlocked state information; and control functions of the component module or a locked state of the component module when the component module is accessible.

The controller may be connected to the component module and controls the component module, when the component module is a registered component module.

The controller may notice restricted accessibility of the component module to the user, when the component module is in a locked state, with the identification information of the component module not registered in the controller memory.

When the component module is in an unlocked state, the controller may control the component module to be in a locked state, and controls identification information of the component module to be registered in the controller memory.

When the locked state of the registered component module is changed into the unlocked state, the controller may delete the identification information of the component module form the controller memory.

The controller may notice danger of losing the corresponding component module to the user, when the locked state of the registered component module is changed into the unlocked state.

The controller may control the identification information of the component module not to be deleted from the controller memory, when the component module registered in the controller memory is detached from the main body.

The component module in the unlocked state may be automatically registered in the controller memory and the unlocked state is changed into the locked state, in a preset time period.

When receiving a loss signal, the controller may change the state of the component module into a locked state and restricts functions of the mobile terminal to allow only emergency calls to designated numbers.

In another aspect of the present disclosure, a method for controlling a mobile terminal including a main body having a controller mounted therein and a component module assembled or attached to the main body, the method includes requesting locked/unlocked state information and identification information from the component module, when a new component module is attached or assembled to the main body or when the power of the mobile terminal is switched on; comparing the identification information of the component module with identification information registered in a controller memory; and allowing or not allowing the controller to control the component module based on the result of the comparison and the locked/unlocked state information.

The allowing or not allowing the control of the controller may allow the controller to control the component module, when the component module is in a locked state, with the identification information of the component module is registered in a controller memory, and restrict the controller to control the component module, when the component module is in the locked state, with the identification information of the component module not registered in the controller memory.

The allowing or not allowing the control of the controller may allow the controller to control the component module, when the component module is in an unlocked state.

The method for controlling the mobile terminal may further include registering identification information of the component module in the controller memory, when changing the unlocked state of the component module into an unlocked state.

The method for controlling the mobile terminal may further include registering module identification information in the controller memory and transferring a unlock command to the unlocked-stated component module; and deleting the identification information of the component module from the controller memory.

The method for controlling the mobile terminal may further include noticing loss/steal danger of the component module.

The method for controlling the mobile terminal may further include detaching the component module from the main body; and alarming a locked state of the detached component module to a user.

The method for controlling the mobile terminal may further include receiving a loss signal; setting all of the component modules in the locked state and restricting functions of the component modules; and activating a function of emergency call to designated phone numbers.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 10A and 10B are a diagram illustrating a screen provided on a display unit, when a component module of one example of the mobile terminal is disassembled;

DESCRIPTION OF SPECIFIC EMBODIMENTS

Figure 1A:
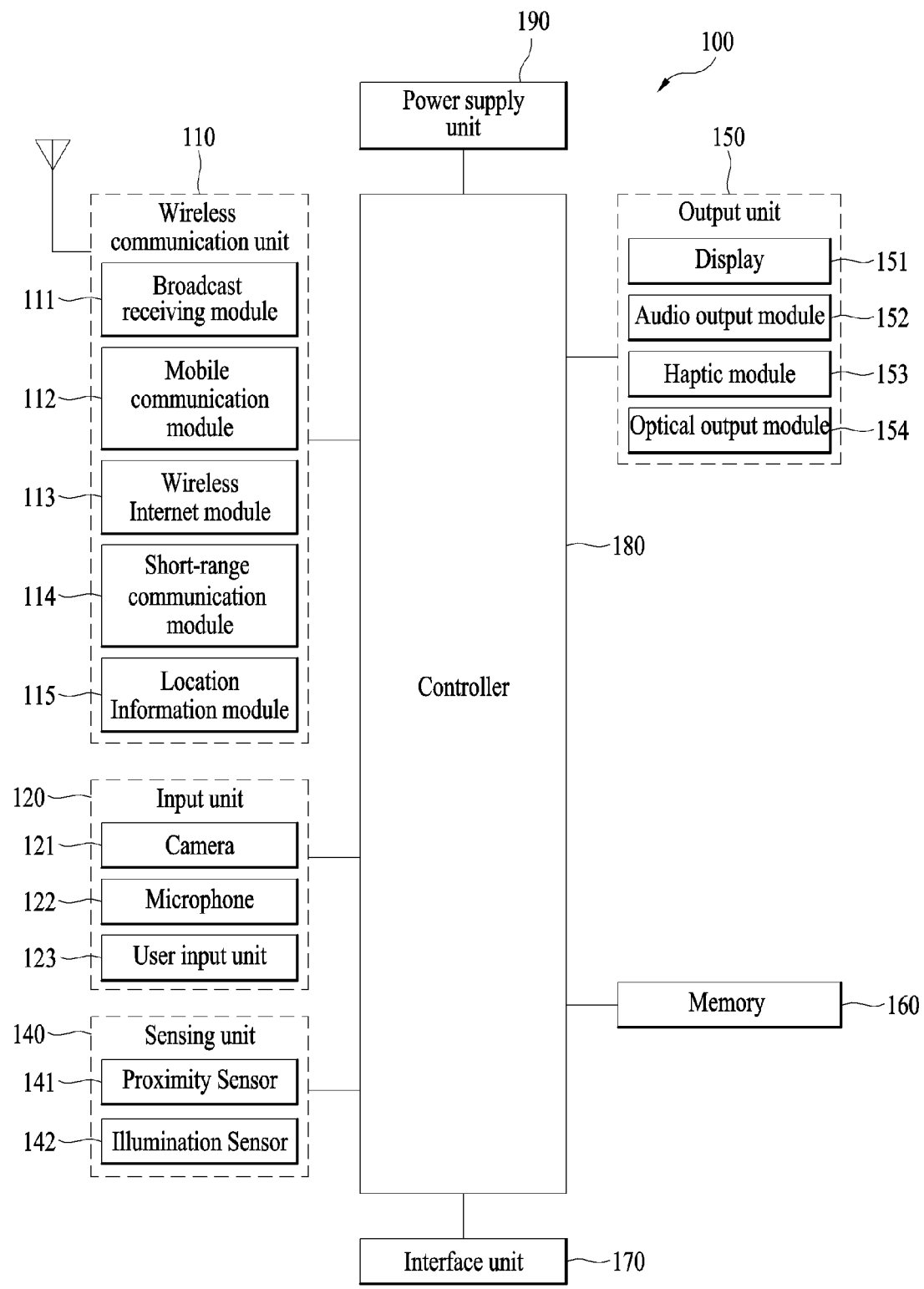
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
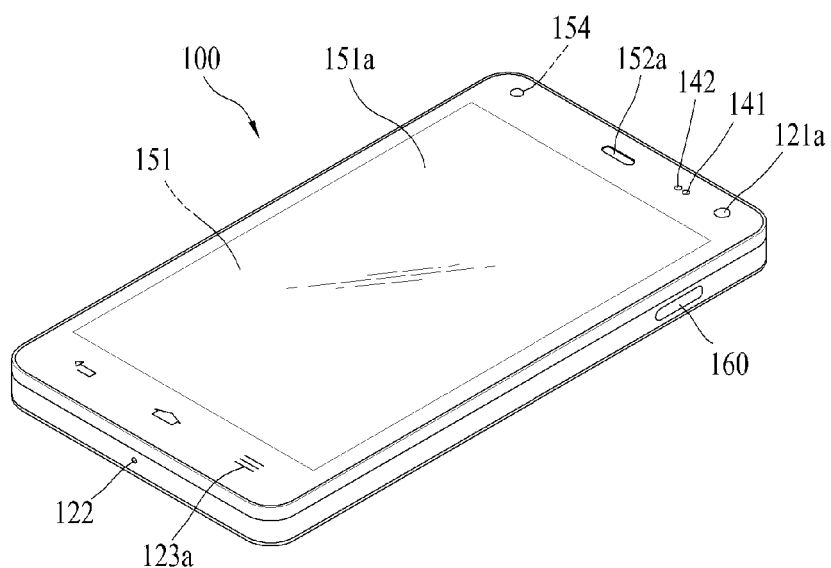
FIGS. 1B and 1C are conceptual views of one example of the mobile terminal, viewed from different directions.
Figure 1C:
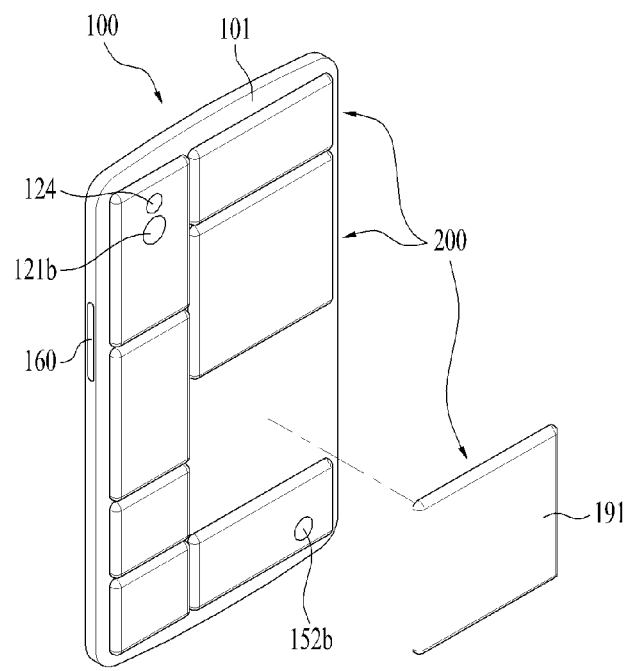

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 includes a main body 101 including the controller loaded therein and component modules 200 coupled to the main body 101. One component module 200 including a display unit is coupled to a front surface of the main body 101. A plurality of component modules 200 including a camera, a speaker, a microphone, a wireless antenna, a battery and the like may be coupled to a rear surface of the main body 101.

The user may easily detach or disassemble the discrete component modules 200 and attach or assemble other or new component modules 200 as the need arises. For example, the user viewing video files mainly may attach or assemble a large memory component module 200. The user using the mobile terminal in picture capturing may attach or assemble a camera module 200 having a high quality lens and a high quality image sensor. The user may attach or assemble a small battery module 200 for portability or a large battery module 200 for a long time use.

Gaps between the component modules 200 assembled to the rear surface may be widened. To cover the gaps, a rear cover (not shown) may be coupled to the rear surface of the main body 101. A hole unit may be provided in the rear cover to expose the camera 121b or the audio output unit 152b outside. Hereinafter, the mobile terminal 100 having the component modules 200 assembled or attached to the main body 101 will be described in detail.

The display unit 151 is shown located on the front side of the terminal body to output information. As illustrated, a window 151a of the display unit 151 may be mounted to the front case 101 to form the front surface of the terminal body together with the front case 101.

The controller 180 is located in the main 101 and the controller 180 may control each of the component modules 200. When identification information of the component modules 200 is not recorded in a controller memory (181, see FIG. 3) in a state where the component modules 200 are locked, access to the component modules 200 is restricted and the controller 200 may not control the component modules 200.

The controller 180 includes the controller memory 181 in which the information about the component modules 200 is registered or recorded. Each of the component modules 200 includes a component module memory 201 in which a locked/unlocked state of the corresponding component module 200 is recorded.

Meanwhile, the mobile terminal 100 may include a waterproof unit (not shown) configured to prevent water from leaking into the terminal body. For example, the waterproof unit may include waterproof material provided between the main body and each component module 200 or a hole unit of each component module 200 to close airtight the internal space formed when the modules are assembled or attached.

The mobile terminal 100 may include the display unit 151, the first and second audio output units 152a and 152b, the proximity sensor 141, the illuminance sensor 142, the optical output unit 154, the first and second cameras 121a and 121b, the first and second manipulation units 123a and 123b, the microphone 122 and the interface unit 160.

Hereinafter, the mobile terminal 100 having following units provided therein will be described. As shown in FIGS. 1b and 1c, in a front surface of the terminal body may be provided the display unit 151, the first audio output unit 152b, the proximity sensor 141, the illuminance sensor 142, the optical output unit 154, the first camera 121a and the first manipulation unit 123a. In a lateral surface of the terminal body may be provided the second manipulation unit 123b, the microphone 122 and the interface unit 160. In a rear surface of the terminal body may be provided the second audio output unit 152b and the second camera 121.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. As shown in FIG. 1c, the audio aperture may be provided in a rear surface of the mobile terminal 100 or it may be provided in a lateral surface of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

Figure 2:
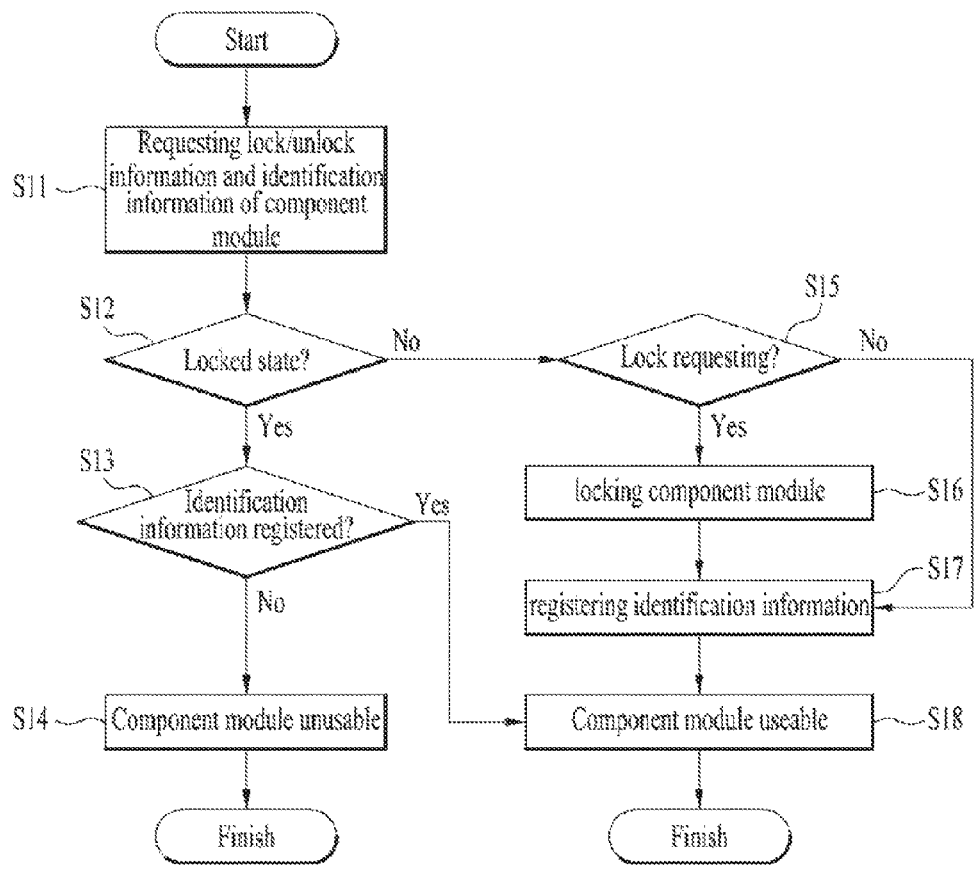
FIG. 2 is a flow chart illustrating a method for managing a lock state of assemblable discrete components provided in one example of the mobile terminal in accordance with the present disclosure.
Figure 3:
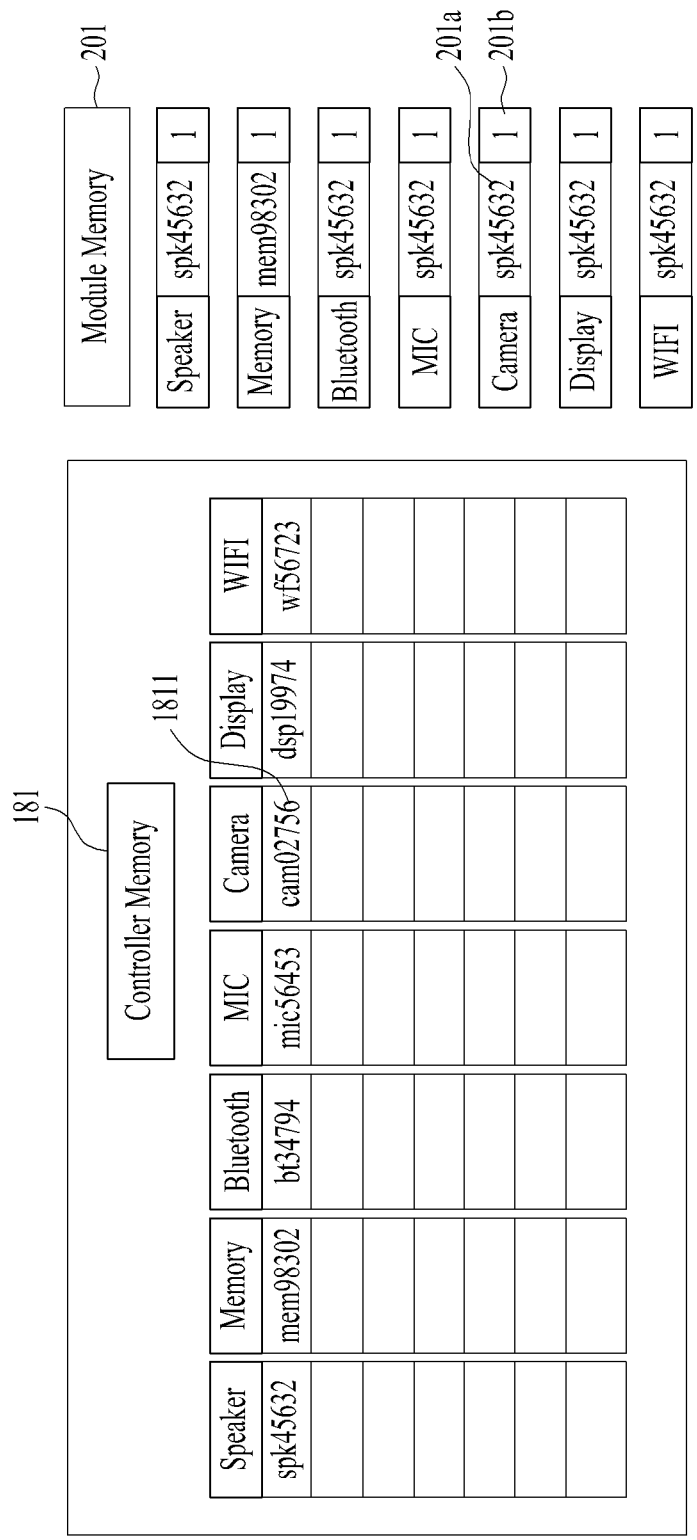
FIG. 3 is a diagram illustrating a memory of a controller and a memory of component module.

FIG. 2 is a flow chart illustrating a method for managing a lock state of assemblable discrete components provided in one example of the mobile terminal 100 in accordance with the present disclosure. FIG. 3 is a diagram illustrating a controller memory 181 and a component module memory 201.

When the controller 180 provided in the main body 101 senses assembling or attachment of new component modules 200 in case the user opens the mobile terminal 100 for the first time, the controller 180 requests locked/unlocked state information 201b and module identification module 201a from the component modules 200 (S11).

In case one component module 200 is in a locked state (S12), it is checked whether the component module identification information 201a is registered in the controller memory 181 (S13). In case the component module identification information is not registered, it is determined that the component module 200 is not accessible and the corresponding component module cannot be used (S14).

However, when the identification information 201*a* of the component module 200 is registered in the controller memory 181 as shown in FIG. 3, the controller 180 may have access to the corresponding component module 200 and control the function of the component module 200.

Meanwhile, in case one component module 200 is in an unlocked state (S12), the controller 180 may have access to the corresponding component module 200. The unlocked component module may be attached or assembled to another main body 101 and used freely. For a robbery or loss case of the mobile terminal, the user may change the unlocked state of the component module into the locked state.

In case the user requests to change the locked state (S15), the unlocked state of the component module 200 is changed into a locked state (S16) and the identification information of the component module 200 is registered in the controller memory 181 (S17). The controller may access to the component modules 200 recorded in the controller memory 181 and uses the function of the corresponding component module 200 (S18). In case there is no request for the lock (S15), the unlocked component module 200 is accessible by the controller and the function of the unlocked component module 200 is accessible.

FIG. 3 is a diagram illustrating the controller memory 181 and the component module memory 201, when all of the component modules 200 are in locked state and registered in the controller memory 181. The identification information 1811 which is equal to the identification information recorded in each of the component module memories 201 is recorded in the controller memory 181.

In case the identification information 1811 of each component module 200 is recorded in the controller memory 181, the present state of the component modules 200 are changed into the locked state and locked/unlocked state information 201*b* is displayed as "1" in the component module memory 201. In contrast, in case the locked state of the component modules 200 are unlocked, locked/unlocked state information 201*b* of the component modules 200 may be displayed as "o".

To set the present state of the component module 200 as the locked or unlocked state, a predetermined pattern or password is input or the user's fingerprint is recognized and then the locked or unlocked state is changed.

When the component module 200 is in the locked state in case the identification information of the corresponding component module 200 is registered in the controller memory 181, the corresponding component module 200 may be accessible and the corresponding component module 200 may be accessible even in another main body 101.

Accordingly, the component modules 200 are initially registered and then locked, so that the robbery or loss of the component modules 200 can be prevented. When the user lend or sell one of the component modules to a third person, the corresponding one is detached from the main body 101 in the unlocked state and then it can be used in the third person's mobile terminal 100.

FIGS. 4 through 6 are diagrams illustrating an image provided on a display unit, a controller memory 181 and a component module memory 210, when the component module 200 of one example of the mobile terminal 100 in accordance with the present disclosure is replaced.

When new component modules 200 are attached and sensed by the controller 180 in case the mobile terminal 100 is started and switched on, the display unit provide a screen of a manage mode configured to manage the component modules 200. In the manage mode screen, types and simple information of the attached component modules may be displayed and icons 1512*a*, 1512*b* and 1512*c* configured to display the attached component modules 200 and locked/unlocked states of the component modules 200 may be displayed. When an area of one component module is selected, detailed identification information of the corresponding component module may be provided.

The positions of the areas corresponding to the component modules, respectively, on the manage mode may be determined according to the positions of the component modules detached to the mobile terminal or they may be arranged in the detachment order. The sizes of the component module areas 1519 may be determined according to the electricity consumed by the component module areas or the memories of the component modules.

Figure 4C:
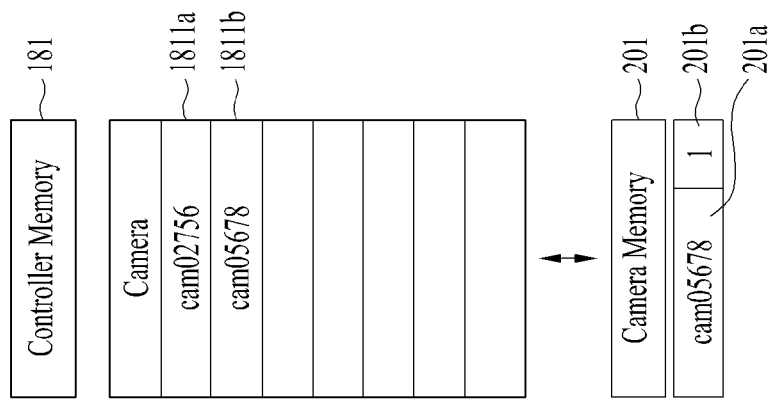
FIGS. 4A through 6B are diagrams illustrating a screen provided on a display unit, a controller memory of and a component module memory, when the component module of one example of the mobile terminal in accordance with the present disclosure is replaced.
Figure 4B:
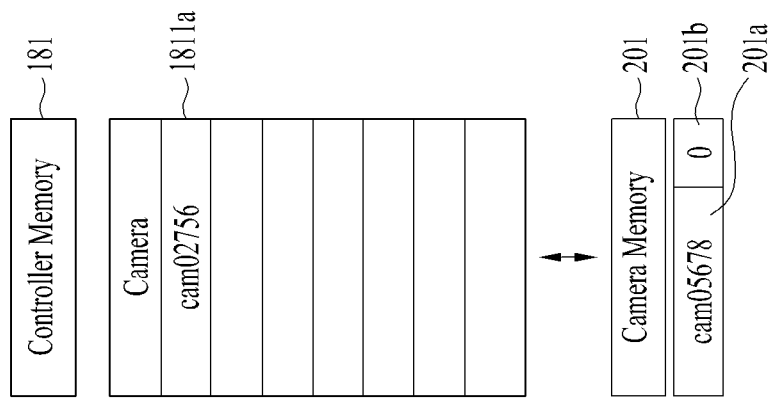
Figure 4A:
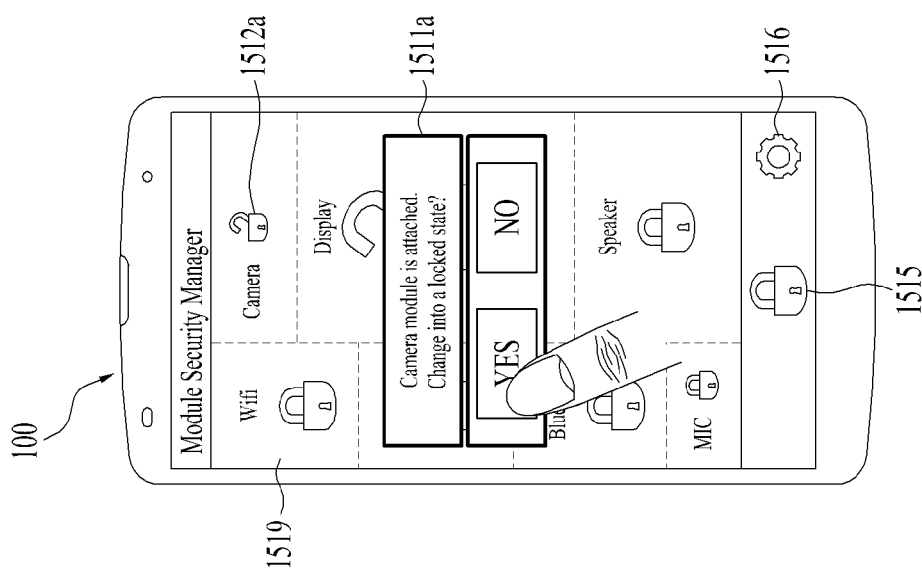
Figure 5A:
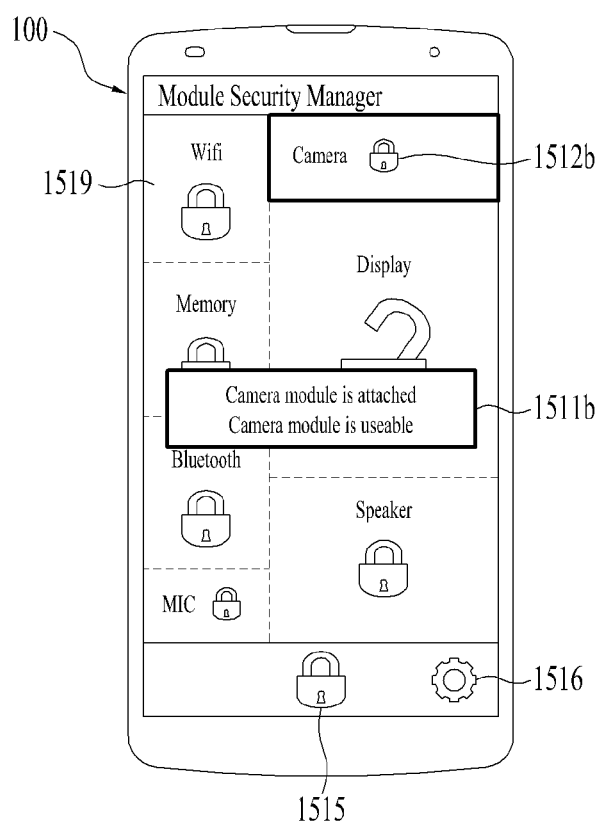

An open lock-shaped icon 1512*a* shown in FIG. 4A may be provided s the unlocked state and a closed lock-shaped icon 1512*b* shown in FIG. 5A may be provided as the locked state. In case of the component module 200 inaccessible or unavailable in the mobile terminal 100, even in the locked state, a closed lock-shaped icon 1512*a* with "X" which means unavailability shown in FIG. 6A. Rather than the icons, different colors may be displayed in the component module areas 1519 as the locked/unlocked state.

FIGS. 4A to 4C are a diagram illustrating that an exchanged camera module 200 is in the unlocked state. One unlocked-stated camera module is attached to the display unit and a message window 1511*a* asking if the user desires to change the locked/unlocked state may be provided (see FIG. 4A).

When the user inputs a command for changing the present state of the new camera module into the locked state, the states of the controller memory 181 and the component module memory 201 shown in FIG. 4B are changed states shown in FIG. 4C. Locked/unlocked state information 201 is changed into "locked" ("1") (S16, see FIG. 2) and identification information 1811*b* of new camera module is registered in the controller memory 181 (S17, see FIG. 2). Even when the state of the camera module 200 is not changed into the locked state rather than when it is changed into the locked state, the new camera module 200 may be accessible (S18, see FIG. 2).

At this time, when the registered component module 200 is detached in the locked state, the identification information 1811*a* of the detached component module 200 remains in the mobile terminal 100, not deleted. In this instance, there are two camera modules accessible only in the corresponding mobile terminal 100.

Figure 5B:
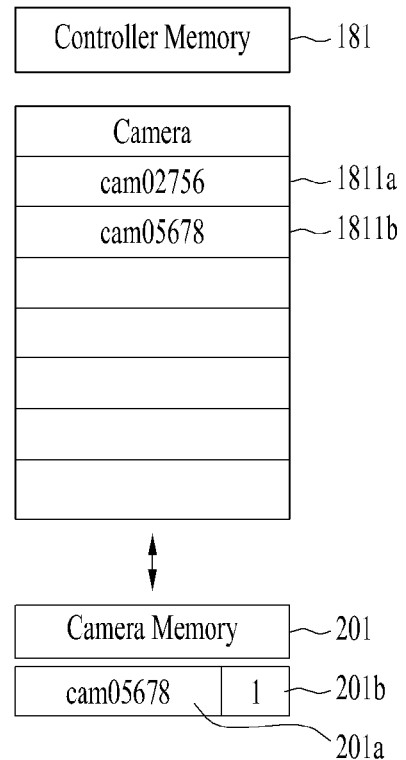

FIGS. 5A and 5B illustrate the display unit, the controller memory 181 and the component module memory 201, in case a locked-stated camera module is attached to the main body 101, with identification information registered in the controller memory 181.

Locked/unlocked state information of a new attached component module 200 is requested (S11, see FIG. 2). When it is in the locked state 201*b*, with identification information registered (181*b*) in the controller memory 181, the new component module 200 is accessible (S12, S13 and S18, see FIG. 2). A message window 1511*b* showing that the attached component module 200 is accessible may be provided.

Figure 6A:
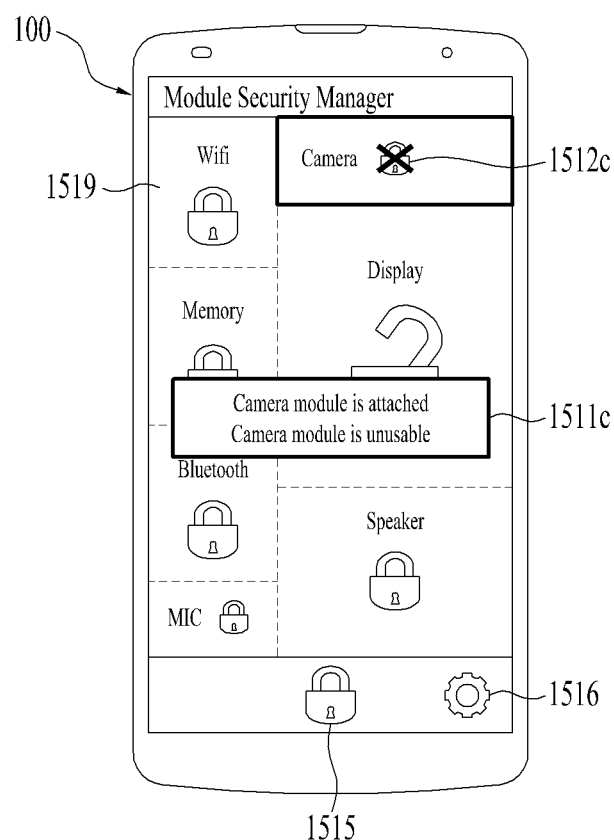
Figure 6B:
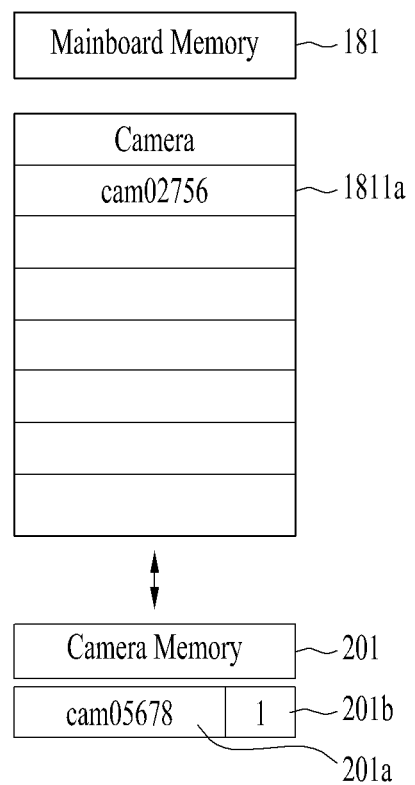

FIGS. 6A and 6B are a diagram illustrating the display unit, the controller memory 181 and the component module memory 201, in case a locked-stated component module 200 is attached to the main body 101, with identification not registered in the controller memory 181.

Locked/unlocked state information and identification information of the new attached component module 200 is requested (S11, see FIG. 2). When it is in the locked state (201*b*), with identification information not registered in the controller memory 181, the new component module 200 is inaccessible (S12, S13 and S14, see FIG. 2). After that, a message 1511*b* showing that the attached component module 200 is not accessible may be provided and an icon 1512*c* indicating that the attached component module 200 is not accessible may be displayed on the display unit.

Figure 7:
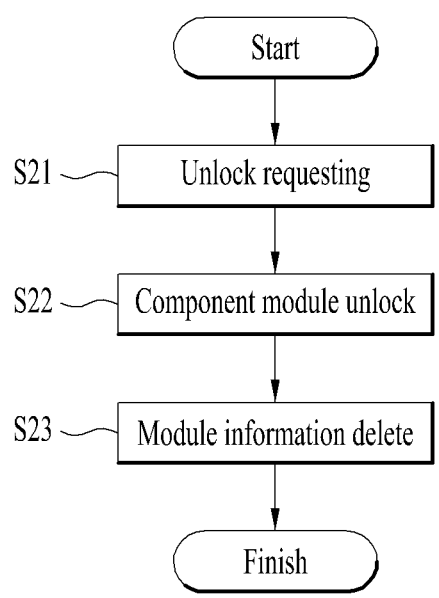
FIG. 7 is a flow chart illustrating a method for unlocking assemblable discrete components provided in one example of the mobile terminal in accordance with the present disclosure.
Figure 8A:
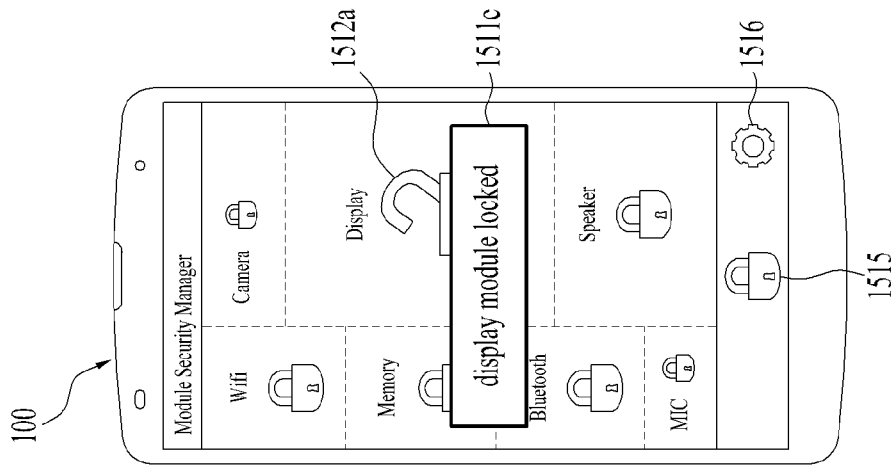
FIGS. 8A to 8C are a diagram illustrating a screen of a display unit to manage a lock state of a component module according to the flow chart of FIG. 7.
Figure 8B:
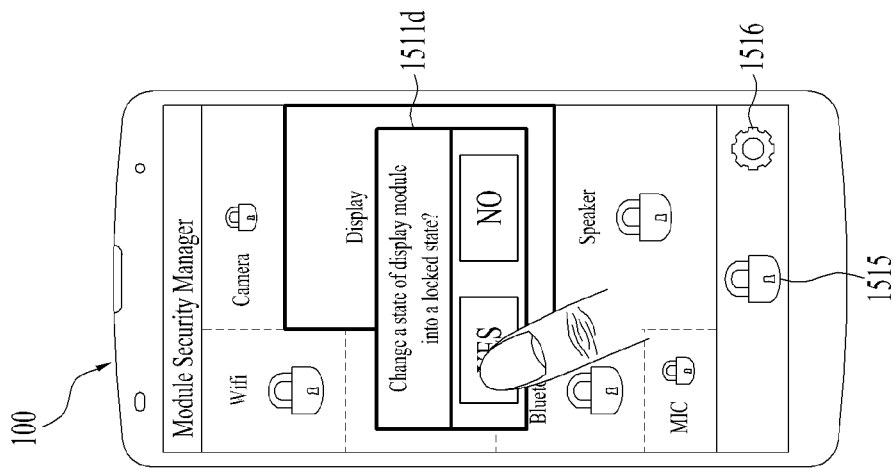
Figure 8C:
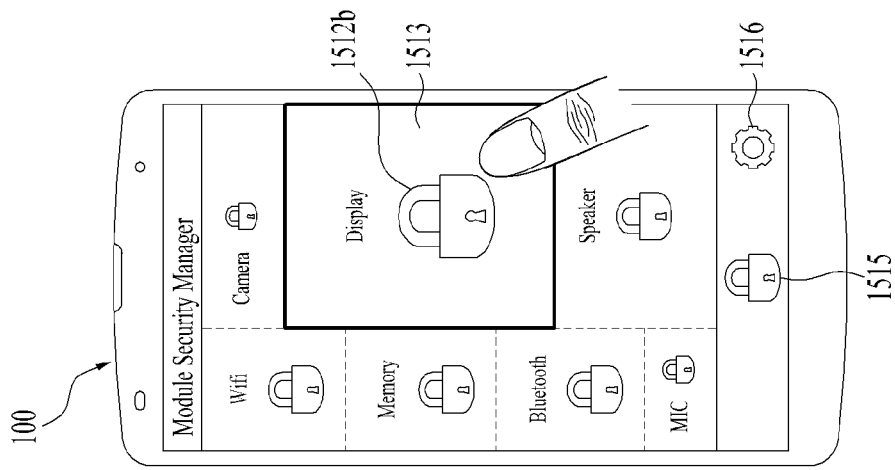

FIG. 7 is a illustrating a method for unlocking assemblable discrete components provided in one example of the mobile terminal in accordance with the present disclosure. FIGS. 8A to 8C are a diagram illustrating a screen of a display unit to manage a lock state of a component module 200 according to the flow chart of FIG. 7.

When try to use one component modules 200 in another terminal or to sell it to a third person, the user has to change the locked state of the corresponding component module 200 into the unlocked state and detach it from the mobile terminal. In the order shown in the flow chart of FIG. 7, the locked/unlocked state may be changed. When there is a user's request for unlocking the component module (S21), the present locked/unlocked state of the corresponding component module is changed into the unlocked state (S222) and the identification information of the corresponding component module is deleted from the controller memory 181 (S23).

When the user selects one component module 1513 as the object to be unlocked shown in FIG. 8A, there is provided a message window 15111*b* asking if the selected component module 200 is unlocked or not. When a command for unlocking the component module is input, the locked state of the corresponding component module is changed into the unlocked state. After that, a message 1511*e* showing change of the locked/unlocked state is displayed and an icon indicating locked/unlocked state is changed (1512*b*->1512*a*).

Figure 9:
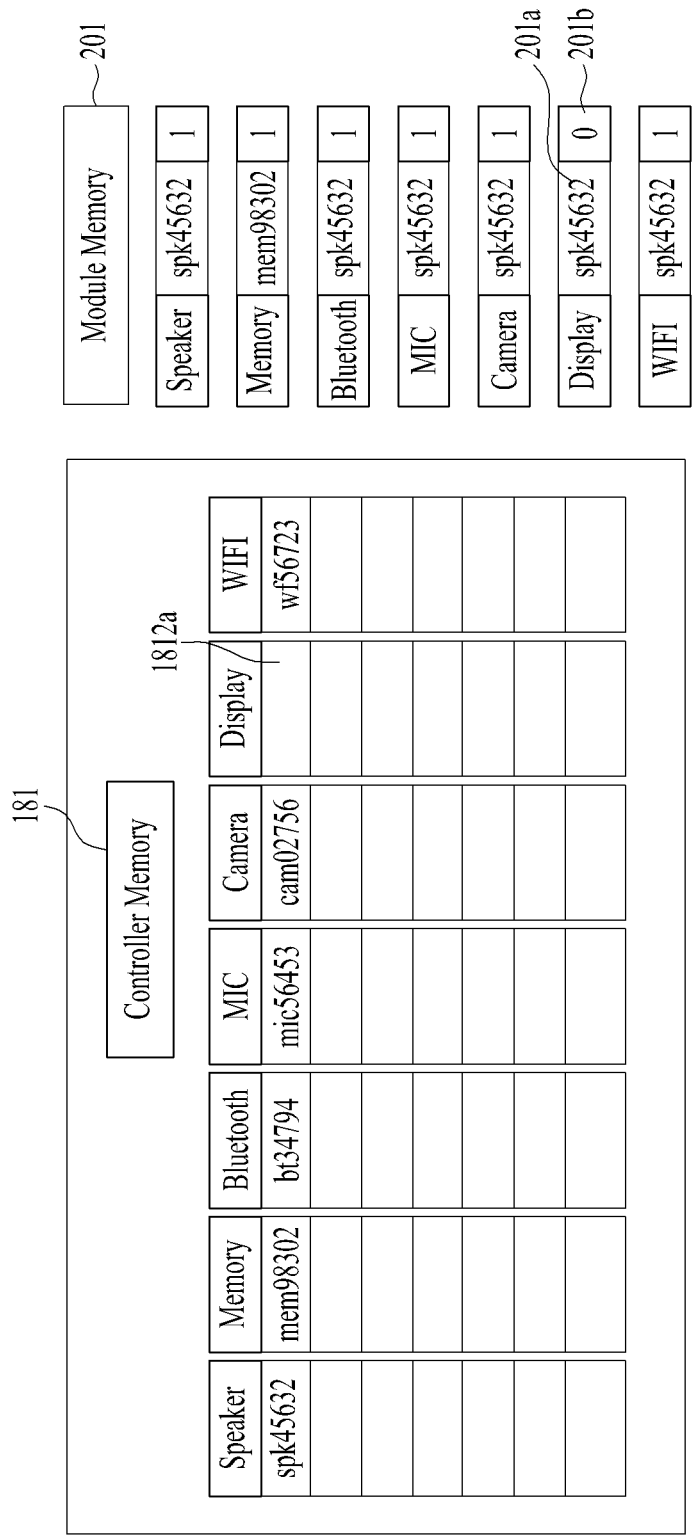
FIG. 9 is a diagram illustrating a memory of a controller and a memory of a component module in S23.

FIG. 9 is a diagram illustrating the controller memory 181 and the component module memory 201 in S23. It is shown in FIG. 9 that the identification information of the component module 200 in the unlocked state changed from the locked state is deleted from the controller memory 181 and the locked/unlocked state information 201*b* of the component module memory 201 is changed into "0".

FIGS. 10A and 10B are a diagram illustrating the screen provided on the display unit when one component module 200 is detached from one example of the mobile terminal 200. When one locked-stated component module 200 is detached as shown in FIG. 10A, there may be provided a message window 1511*f* showing that the component module detached in the locked state is not accessible in other terminals. However, when one component module 200 in the unlocked state is detached as shown in FIG. 10B, there may be provided a message window 1511*g* showing that the component module detached in the unlocked state is accessible in other terminals.

Figure 11A:
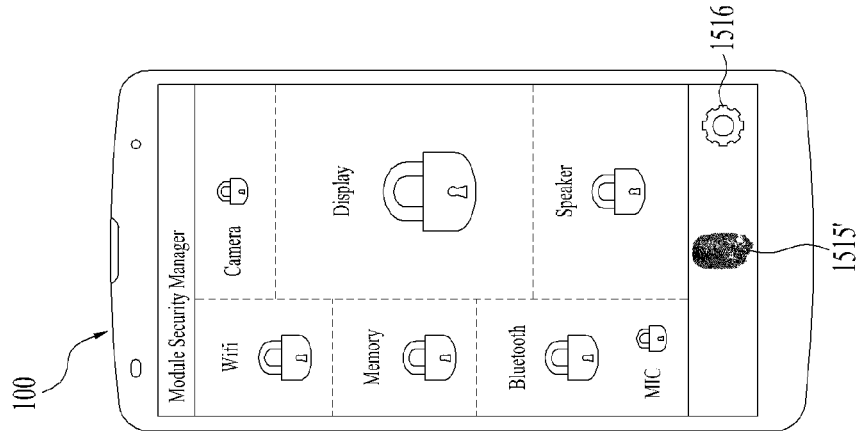
FIGS. 11A to 11C are a diagram illustrating a setting method related with security of a component module provided in one example of the mobile terminal.
Figure 11B:
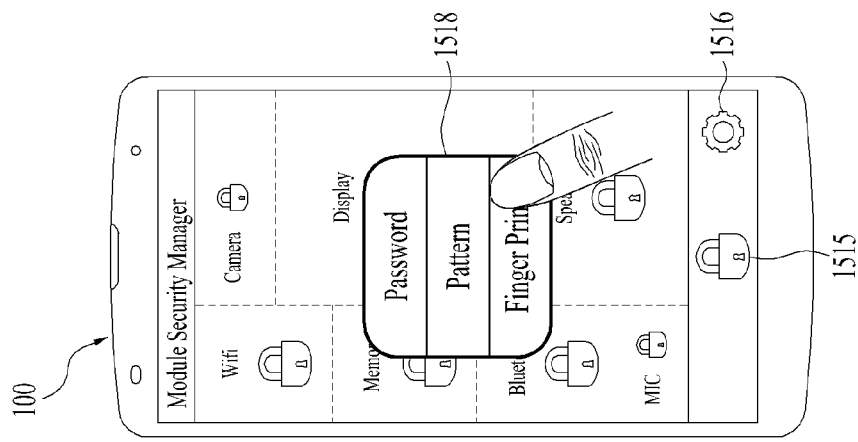
Figure 11C:
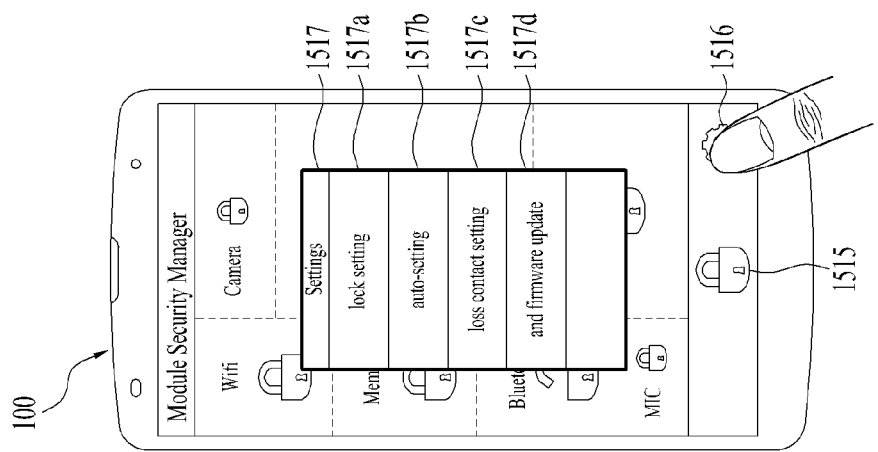

FIGS. 11A to 11C are a diagram illustrating setting menus for the component modules 200 assemblable or detachable from one example of the mobile terminal 100. When the user selects a setting icon 1516, setting menus 1517 shown in FIG. 11A are provided. The setting menus 1517 include a lock setting 1517*a*, an auto-lock setting 1517*b*, a terminal-loss contact setting 1517*c*, a firmware update 1517*d* and the like.

When selecting the lock setting menu 1517*a*, the user may set a locked/unlocked state setting method. The user selects one of password inputting, pattern inputting and user fingerprint recognizing methods from a menu 1518 to change the locked/unlocked state. When the locked/unlocked state setting method is changed, a profile of a lock icon 1515' shown in FIG. 11C may be changed.

In a preset time period after the unlocked-stated component module is attached, the unlocked state may be controlled to be automatically changed into the locked state and the user may designate an auto-lock setting time, using the auto-lock setting 1517*d*.

Figure 12:
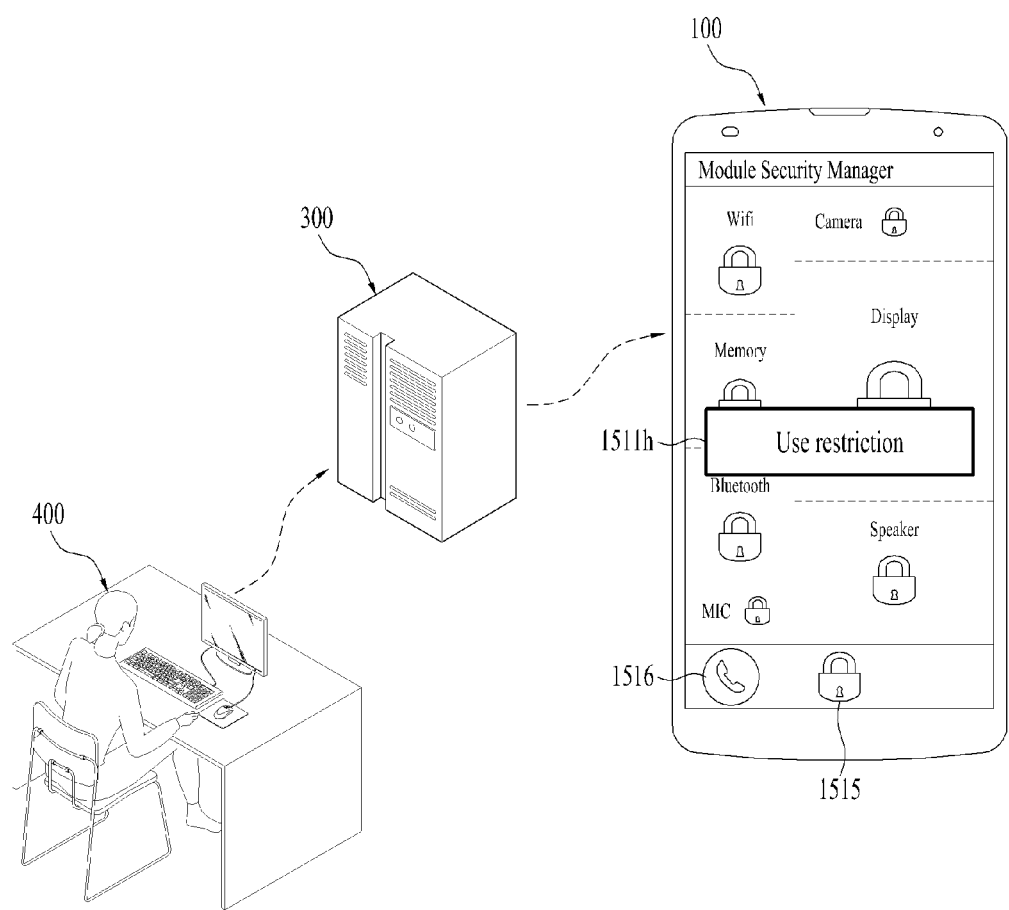
FIG. 12 is a diagram illustrating a method for controlling the mobile terminal in remote, when the mobile terminal in accordance with the present disclosure is lost.

FIG. 12 is a diagram illustrating a method for controlling the mobile terminal 100 in remote, when the mobile terminal 100 in accordance with the present disclosure is lost. When the user report the mobile terminal missing to a mobile service company 300, the mobile service company 300 changes the present states of the component modules 200 in the corresponding mobile terminal 100 into the locked states and allows the corresponding mobile terminal to make only emergency calls.

A use restriction message 1511*h* is displayed on the display unit as shown in FIG. 12. All of the component modules 200 display closed lock shaped icons, respectively. Setting icons 1516 disappear and only an emergency call button 1519 is provided. Phone numbers for the emergency calls may be designated in a loss contact setting menu 1517*c* of the setting menus shown in FIG. 11 and calls can be made only to the designated numbers through the mobile terminal. As the mobile terminal is controlled in remote, the component modules are allowed to be detached from the lost mobile terminal 100 and used. Accordingly, the lost mobile terminal 100 can be easily found or reclaimed.

According to at least of the embodiments mentioned above, the use of the components possessed by the mobile terminal 100 in other terminals may be restricted. Also, loss and illegal use of the component modules may be prevented.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
    a main body;
    a display;
    a component module coupled to the main body;
    a controller located in the main body and comprising a controller memory, wherein the controller is configured to:
    receive locked state information and module identification information of the component module from the component module, wherein the locked state information indicates that the component module is in either a locked state or is in an unlocked state;
determine that the component module is a registered component module when the module identification information is registered in the controller memory;
identify the component module as accessible when the component module is in the locked state and the component module is the registered component module;
identify the component module as inaccessible when the component module is in the locked state and the component module is not the registered component module;
identify the component module as accessible when the component module is in the unlocked state, after which a lock request is received, the component module is changed to the locked state, and the module identification information is registered in the controller memory;
identify the component module as accessible when the component module is in the unlocked state and the lock request is not received, after which the module identification information is registered in the controller memory;
connect to the component module and control functions of the component module when the component module is identified as accessible; and
delete the module identification information of the component module from the controller memory, when the locked state information is changed from the locked state to the unlocked state.

2. The mobile terminal of claim 1,
wherein the controller is further configured to:
control the display to display a notice indicating restricted accessibility of the component module when the locked state information indicates the component module is in the locked state.

3. The mobile terminal of claim 1,
wherein the controller is further configured to:
control the display to display a warning as to the component module when the locked state of the component module is changed to the unlocked state.

4. The mobile terminal of claim 1, wherein the controller is further configured to:
maintain storing in the controller memory of the module identification information of the component module when the component module is decoupled from the main body.

5. The mobile terminal of claim 1, wherein the module identification information of the component module in the unlocked state is automatically registered in the controller memory and the unlocked state is changed to the locked state in a preset time period.

6. The mobile terminal of claim 1, wherein the controller is further configured to:
change a state of the component module from the unlocked state to the locked state and restrict functions of the mobile terminal except for emergency calls to designated numbers when a loss indication is received at the mobile terminal.

7. A method for controlling a mobile terminal comprising a main body and component module coupled to the main body, wherein the method comprises:
receiving locked state information and module identification information from the component module when the component module is coupled to the main body or when power of the mobile terminal is switched on, wherein the locked state information indicates that the component module is in either a locked state or is in an unlocked state, and wherein the component module is in the locked state at least once and is in the unlocked state at least once;
storing, in controller memory, the module identification information of the component module, when the locked state information is changed from the unlocked state to locked state;
deleting the module identification information of the component module from the controller memory, when the locked information is changed from the locked state to the unlocked state;
determining that the component module is a registered component module, when the module identification information is registered in the controller memory;
identifying the component module as accessible when the component module is in the locked state and the component module is the registered component module;
identifying the component module as inaccessible when the component module is in the locked state and the component module is not the registered component module;
identifying the component module as accessible when the component module is in the unlocked state, after which a lock request is received, the component module is changed to the locked state, and the module identification information is registered in the controller memory;
identifying the component module as accessible when the component module is in the unlocked state and the lock request is not received, after which the module identification information is registered in the controller memory;
permitting a controller of the mobile terminal to control the component module when the component module is identified as accessible; and
not permitting the controller of the mobile terminal to control the component module when the component module is identified as inaccessible.

8. The method of claim 7, further comprising:
displaying on a display a warning as to the component module when the locked state component module is decoupled from the main body of the mobile terminal.

9. The method of claim 7, further comprising:
displaying on a display a warning as to the component module when the component module is decoupled from the main body of the mobile terminal.

10. The method of claim 7, further comprising:
receiving a loss indication;
setting all component modules of the mobile terminal, including the component module, to the locked state and restricting functions of the component modules in response to the receiving of the loss indication; and
activating an emergency call function to a designated phone number.

11. The mobile terminal of claim 1, wherein the locked state information indicates that the component module is in the locked state at least once and is in an unlocked state at least once.

* * * * *